United States Patent [19]

Torres

[11] 4,392,017
[45] Jul. 5, 1983

[54] TELEPHONE HANDSET LIFTING DEVICE

[76] Inventor: Luis R. Torres, 3505 Fir St., East Chicago, Ind. 46312

[21] Appl. No.: 241,122

[22] Filed: Mar. 6, 1981

[51] Int. Cl.³ .......................................... H04M 15/00
[52] U.S. Cl. ............................. 179/1 HS; 200/38 CA; 200/38 D; 179/2 TC
[58] Field of Search ................. 179/1 HS, 2 A, 2 DP, 179/2 TC, 6.03, 7.1 R, 84 C, 90 A, 90 AD, 159; 200/33 R, 38 D, 38 CA; 335/258

[56] References Cited

U.S. PATENT DOCUMENTS

| | | | |
|---|---|---|---|
| 3,267,221 | 8/1966 | Caldwell | 179/90 AD |
| 3,268,670 | 8/1966 | Shadrick | 179/90 AD |
| 3,281,741 | 10/1966 | Beliveau | 335/258 |
| 3,445,601 | 5/1969 | Whitely et al. | 179/90 AD |
| 3,777,065 | 12/1973 | Galian et al. | 179/2 A |
| 3,982,072 | 9/1976 | Dean | 179/2 TC |
| 4,109,119 | 8/1978 | Baelz et al. | 200/38 D X |

Primary Examiner—G. Z. Rubinson
Assistant Examiner—W. J. Brady
Attorney, Agent, or Firm—Walter Leuca

[57] ABSTRACT

This invention operates in combination with a cradle supported telephone handset. It includes an electric switch operated by a variable timer which is set to operate at various times of a period of absence and for lengths of time selected by the occupant of a dwelling prior to vacating or leaving his dwelling. The electric current which is controlled by the switch energizes an electromagnetic coil periodically as preselected on the timer. The energizing of the electromagnetic coil operates to lift a shaft the end of which is formed to support the telephone handset and by which means the telephone handset is lifted from its cradle position on the telephone to close the telephone switch and thereby render the telephone in operating condition producing a busy signal indicative of occupancy.

13 Claims, 3 Drawing Figures

TELEPHONE HANDSET LIFTING DEVICE

BACKGROUND OF THE INVENTION

1. Field of the Invention

This invention relates generally to security devices and more particularly to devices for interrupting a telephone pattern indicative of vacancy.

2. Description of the Prior Art

It is common practice for burglars to observe the daily habits of their intended victims in order to determine the duration of vacancy of the victims' residences in planning their burglaries. Periods of occupancies and vacancies, presence and absence of their automobile, and periods of light and darkness within their residences are noted. These are all externally observable manifestations or indicators of occupancy or vacancy. Usually the burglar will be more confident in his knowledge of vacancy of the premises he plans to burglarize if he had some indication from within the victim's residence as to vacancy or occupancy. This knowledge is almost always acquired by telephoning the victim's residence over a period of time that he suspects that the residence is unoccupied for several days or longer to make certain or to establish a pattern of vacancy since unknown members of the intended victim's family may be present or in occupancy. If the telephone is answered or a busy signal is encountered indicating that the telephone is in use, the presence of someone in the residence is thereby presumed and the burglar will postpone or abandon his plan to commit a burglary or to "break-in" that particular residence. Since no clear pattern of vacancy can be established, he will abandon his plans to burglarize that particular residence.

SUMMARY OF THE INVENTION

This invention operates in combination with a cradle supported telephone handset. It includes an electric switch operated by a variable timer which is set to operate at various times of a period of absence and for lengths of time selected by the occupant of a dwelling prior to vacating or leaving his dwelling. The electric current which is controlled by the switch energizes an electromagnetic coil periodically as preselected on the timer. The energizing of the electromagnetic coil operates to lift a shaft the end of which is formed to support the telephone handset and by which means the telephone handset is lifted from its cradle position on the telephone to close the telephone switch and thereby render the telephone in operating condition producing a busy signal indicative of occupancy.

Another object of this invention is to provide timing means to selectively place a telephone in a busy signal condition for irregular periods of time at irregular intervals of time.

Other objects and advantages of this invention will become apparent upon a more careful study of the following detailed description taken with reference to the accompanying drawings wherein is illustrated a preferred embodiment of this invention.

DESCRIPTION OF THE PREFERRED EMBODIMENT

Figure 1:
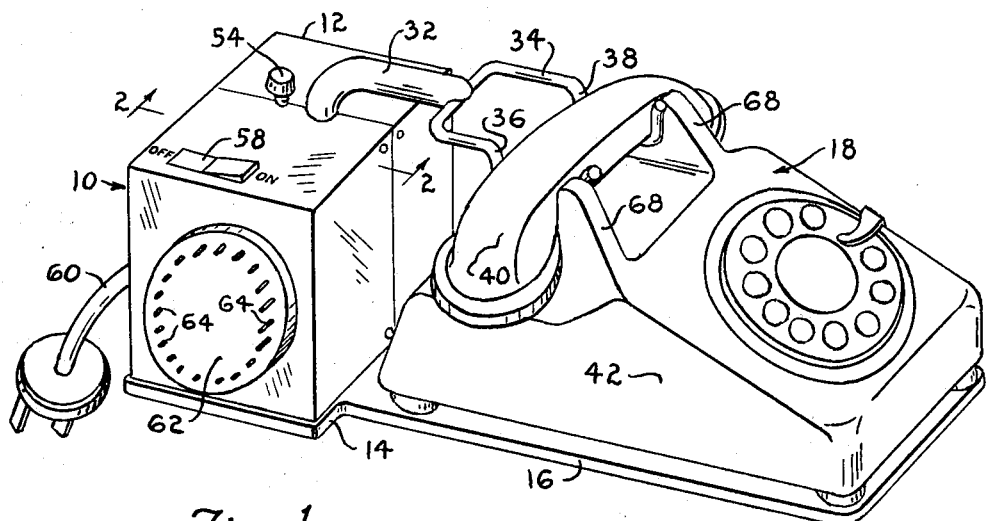
FIG. 1 is a perspective view of my invention shown in operative relationship with the telephone base and handset combination.

Referring now more particularly to the drawings wherein is illustrated in the several figures described, a preferred embodiment of the telephone handset lifting device of my invention. It is designated generally by the numeral 10. Specifically, this embodiment of my invention comprises a housing 12 mounted on a base 14 provided with an extended plate 16 which serves as a stand for telephone 18. Provided in housing 12 is an electromagnetic coil 20 supported on a wall of the housing so that center passageway 22 of coil 20 is disposed in a vertical direction. Passageway 22 is adapted to receive metal core 24. Core 24 serves as a magnetic core and is freely movable in passageway 22 of coil 20. Core 24 is longitudinally connected to shaft or arm member 26 preferrably formed from non-magnetic material such as an aluminum alloy or plastic. Magnetic core 24 is fixed to shaft 26 so that any vertical movement of core 24 carries with it shaft or arm member 26. The bottom end of shaft 26 is shown extending below core 24 and passes through guide ring 28 mounted on base 14. The top portion of shaft 26 extends vertically through aperture 30 provided in housing 12. Top portion of shaft 26 extending exterior of housing 12 is angled to extend horizontally as at 32. Fixed to the distal end of horizontal extension 32 is a bifurcated handle means 34 formed cradle fashion as at 36 and 38 to support telephone handset 40 at spaced apart locations while cradled on the telephone base 42 and when lifted therefrom.

Figure 2:
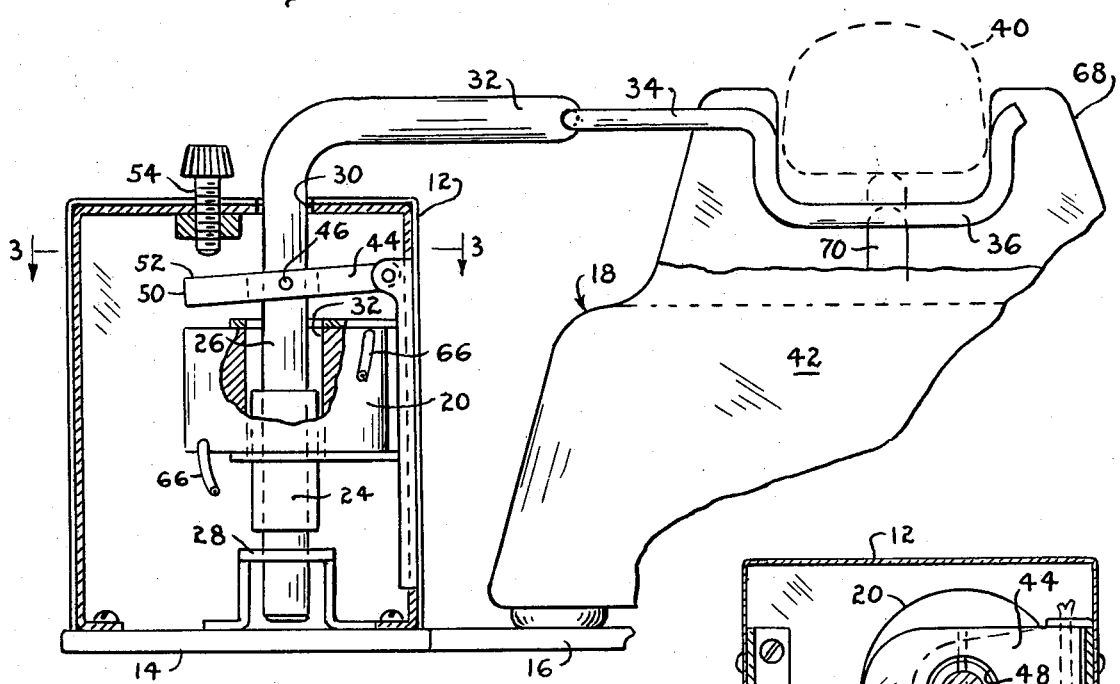
FIG. 2 is a cross section view of my invention taken along line 2—2 of FIG. 1 with the telephone base and handset combination in fragment.
Figure 3:
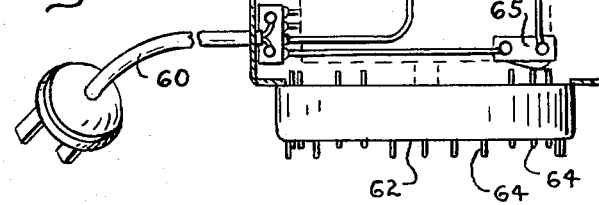
FIG. 3 is a top section view of my invention taken along line 3—3 of FIG. 2.

I further provide a lever 44 interior of housing 12 pivotally connected to a wall thereof. Lever 44 is pivotally connected to shaft 26 by means of pin 46. The connection between lever 44 and shaft 26 takes any convenient form. For example, as more clearly shown in FIGS. 2 and 3, lever 44 of this embodiment is provided with a hole 48 through which shaft 26 passes and the distal end 52 of lever 44 extends beyond shaft 26 to provide stop means which abutts against the end of adjustable screw 54 so that the distance that shaft 26 is vertically raised by means of electromagnetic coil 20, and consequently the lifting of telephone handset 40 cradled by bifurcated handle means 34 can be adjustably determined.

Either separate from or included in housing 12 is timer mechanism 56. Timer mechanism 56 is provided with an off-on switch 58 in the circuit of cord 60 connected to a conventional plug by which means it is connected to an outlet receptacle. Timer mechanism 56 comprises a motor operable by the electric current and gearing connected thereto to provide a clock movement mechanism. These elements are not shown since they are well known to the prior art. The clock movement mechanism rotates clock movement wheel 62 which is provided with time increment switch elements 64 which are manually positioned to switch current on and off as at 65 to circuit lines 66 connected to electromagnetic coil 20. Time increment switch elements 64 are provided to selectively energize and deenergize electromagnetic coil 20 for any length of time and any number of times during the 24 hour cycle while this invention is in operation.

In the operation of this invention I place the telephone on stand 16 so that the back end of telephone base 42 is adjacent housing 12 and bifurcated handle means 34 extend between the telephone handset cradle 68 and positioned below the telephone handset 40. When it is desired to put this invention in operation, time increment switches 64 on clockwork wheel 62 are set to a plurality of selective times to operate on-off switch 65 so that the current through circuit line 66 energizes the electromagnetic coil 20 for any length of time desired and any number of times desired during a period of absence. Main off and on switch 58 is turned on and the device of this invention is thereby put in operation. When the programmed time arrives, one of the time increment switch elements 64 moves switch 65 to close the circuit line 66 thereby energizing electromagnetic coil 20 causing the magnetic flux which forms around the coil and through passageway 22 to attract magnet core 24 to the center of the flux in passageway 22 where it is most concentrated. This lifts magnet core 24 into passageway 22 thereby lifting with it shaft 26 to which it is connected. The lower end of shaft 26 is guided for vertical movement by guide member 28.

This action lifts the bifurcated handle means 34 together with telephone handset 40 from its cradle support 68 on telephone base 42 thereby releasing the telephone busy signal switch 70 putting into operation the busy signal of the telephone for a programmed period of time. During this time the clockwork wheel 62 advances to a cut-off switch element 64 which allows switch 64 to move under the bias of a spring for example which opens the circuit line 66 causing the electromagnetic coil 20 to deenergize with the result that magnet core 24, shaft 26 and telephone handset 40 under the force of gravity will drop, settling handset 40 back onto its cradle 68 and thereby close the busy signal switch 70 placing the telephone in non-use condition. The timer mechanism 56 and clock movement wheel 62 continues to operate switch 65 turning the current to coil 20 on and off periodically at odd times, for different lengths of time, to lift the telephone handset and thereby render the telephone busy at and for irregular periods of time throughout the period of vacancy of the dwelling.

It is more desired to permit a caller to determine that the telephone ringing is occasionally unanswered rather than to place the telephone in condition for rendering a busy signal at all times since it would then be obvious that the handset was taken off the cradle and left off to give the appearance of use which due to the prolonged period of time would be unnatural and would itself be evidence of non-occupancy. It is common knowledge that anyone determined to break in a dwelling will repeatedly telephone a place suspected of being unoccupied and receiving responses on the telephone indicating telephone use and non-use at odd or irregular times for irregular periods would be more indicative of occupancy than not. The fact that the telephone rings and is unaswered by the occupant can be considered by the caller as being temporarily unavailable at that time to answer the telephone, such as being for example, in the basement, washroom or otherwise indisposed. A random subsequent call encountering a busy signal would indicate normal occupancy thereby rendering the caller uncertain as to the vacancy of the premises and consequently encourage abandonment of plans to burglarize the dwelling having my invention in combination with the telephone.

I claim:

1. A telephone handset lifting device comprising:
an electromagnetic coil;
shaft means formed to extend vertically through said electromagnetic coil, and horizontally across said coil;
said shaft means being vertically moveable by said electromagnetic coil;
structure for supporting said coil and said shaft means;
the end of said horizontally extending shaft means being formed to support a telephone handset for raising and lowering said telephone handset;
an electric current circuit connected to said coil for energizing said coil;
switch means in said electric current circuit operable to open and close said circuit;
a time sequence means for operating said switch means; and
a plurality of manually operable elements on said time sequence means arranged thereon to preselect a plurality of irregular time sequences for operating said switch means repeatedly during a time cycle.

2. The telephone handset lifting device of claim 1 wherein said shaft means vertically movable by said electromagnetic coil is further characterized as having abutting means to limit the vertical movement of said shaft means.

3. The telephone handset lifting device of claim 2 wherein said structure for supporting said coil and said shaft means is further characterized as having stop means for engaging said abutting means.

4. The telephone handset lifting device of claim 3 wherein said stop means is further characterized as being adjustably positioned.

5. The telephone handset lifting device of claim 1 wherein said shaft is further characterized as being guided in its vertical movement.

6. The telephone handset lifting device of claim 5 wherein said electromagnetic coil is further characterized as having a central passageway in which shaft means is axially movable, and said central passageway is vertically disposed.

7. A telephone handset lifting device comprising:
a plate member for supporting a telephone base;
a housing on a portion of said plate member;
an electromagnetic coil in said housing;
shaft means axially moveable by said electromagnetic coil in said housing;
said shaft means extending through an aperture in said housing exterior of said housing, said shaft means exterior of said housing being horizontally disposed;
means supporting a telephone handset, said means extending from the distal end of said horizontally disposed shaft member;
an electric current circuit connected to said coil for energizing said coil;
switch means in said electric current circuit operable to open and close said circuit;
a time sequence means for operating said switch means; and
a plurality of manually operable elements on said time sequence means arranged thereon to preselect a plurality of irregular time sequences for operating said switch means repeatedly during a time cycle.

8. The telephone handset lifting device of claim 7 wherein said shaft means axially movable by said electromagnetic coil in said housing is further characterized as having abutting means to limit the axial movement of said shaft means.

9. The telephone handset lifting device of claim 8 wherein said housing is further characterized as having stop means for engaging said abutting means.

10. The telephone handset lifting device of claim 9 wherein said stop means is further characterized as being adjustably positioned.

11. The telephone handset lifting device of claim 7 wherein said shaft means is further characterized as being guided in its axial movement.

12. The telephone handset lifting device of claim 11 wherein said electromagnetic coil is further characterized as having a central passageway in which shaft means is axially movable, and said central passageway is vertically disposed.

13. A telephone handset lifting device comprising:
- a plate member for supporting a telephone base;
- a housing on a portion of said plate member;
- an electromagnetic coil supporting in said housing;
- an arm member vertically moveable by said electromagnetic coil in said housing;
- said arm extending through an aperture in said housing exterior of said housing, said arm member exterior of said housing being horizontally disposed;
- said arm member supporting a telephone handset at the distal end thereof for raising and lowering said telephone handset;
- an electric current circuit connected to said coil for energizing said coil;
- switch means in said electric current circuit operable to open and close said circuit;
- a time sequence means for operating said switch means; and
- a plurality of manually operable elements on said time sequence means arranged thereon to preselect a plurality of time sequence programs for operating said switch means repeatedly during a time cycle.

* * * * *